US008232511B2

(12) United States Patent
Lin et al.

(10) Patent No.: US 8,232,511 B2
(45) Date of Patent: Jul. 31, 2012

(54) SENSING SYSTEM ADAPTED TO SENSE A POINTER AND CALCULATE A LOCATION OF THE POINTER

(75) Inventors: Cho-Yi Lin, Hsinchu (TW); Hsin-Chi Cheng, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 559 days.

(21) Appl. No.: 12/422,191

(22) Filed: Apr. 10, 2009

(65) Prior Publication Data

US 2010/0094586 A1 Apr. 15, 2010

Related U.S. Application Data

(63) Continuation-in-part of application No. 12/249,222, filed on Oct. 10, 2008, now Pat. No. 7,689,381.

(30) Foreign Application Priority Data

Jan. 12, 2009 (TW) ................................ 98100969 A

(51) Int. Cl.
*G06F 15/00* (2006.01)

(52) U.S. Cl. ..................................... 250/203.1; 702/151

(58) Field of Classification Search ............... 250/203.1; 702/150–153; 345/157–158, 173; 382/312; 178/18.09

See application file for complete search history.

(56) References Cited

U.S. PATENT DOCUMENTS 4,507,557 A 3/1985 Tsikos
4,782,328 A 11/1988 Denlinger
6,036,189 A 3/2000 Gomez et al.
6,803,906 B1 10/2004 Morrison et al.
7,109,978 B2 9/2006 Gillespie et al.
7,692,625 B2 * 4/2010 Morrison et al. ............. 345/156
7,755,026 B2 * 7/2010 Pittel et al. ............... 250/227.13
7,755,613 B2 * 7/2010 Morrison et al. ............. 345/173
7,907,124 B2 * 3/2011 Hillis et al. ................... 345/173
7,924,272 B2 * 4/2011 Boer et al. .................... 345/175
2005/0243070 A1 11/2005 Ung et al.
2009/0090569 A1 4/2009 Lin

FOREIGN PATENT DOCUMENTS

JP 1984-211128 11/1984
JP 2005-025415 1/2005
WO 2005034027 A1 9/2004

* cited by examiner

*Primary Examiner* — Seung C Sohn
(74) *Attorney, Agent, or Firm* — Chung-Ming Shih

(57) ABSTRACT

A sensing system is adapted to sense a pointer and calculate a location of the pointer. The sensing system includes a panel, a reflective element, an image sensor and a processor connected to the image sensor. The panel has a first plane and a first area located at the first plane. The first area is quadrangular and has a first boundary, a second boundary, a third boundary and a fourth boundary connected in order. The reflective element is disposed at the first boundary and located on the first plane. A second plane of the reflective element which is a reflective mirror plane is substantially perpendicular to the first plane and mirrors the first area to form a second area. The image sensor sensing the first and the second areas is disposed at a corner at which the third boundary and the fourth boundary intersects and located on the first plane.

17 Claims, 8 Drawing Sheets

SENSING SYSTEM ADAPTED TO SENSE A POINTER AND CALCULATE A LOCATION OF THE POINTER

This application is the continuation-in-part (CIP) of the U.S. application Ser. No. 12/249,222 filed on Oct. 10, 2008 now U.S. Pat. No. 7,689,381 and claims priority to the Taiwan application No. 098100969 filed on Jan. 12, 2009.

BACKGROUND

1. Field of the Invention

The present invention relates to a sensing system, and more particularly, to a sensing system having a reflective element.

2. Description of the Related Art

Touch systems have been disclosed in many patents, such as U.S. Pat. No. 4,782,328 and U.S. Pat. No. 6,803,906. Each of the touch systems disclosed in the above two patents must have at least two sensors, such that the production cost of each of the touch systems disclosed in the patents is relatively high. One of the two patents is described thereinafter in detail.

FIG. 1 is a schematic view of a conventional touch screen system. Referring to FIG. 1, the touch screen system 100 disclosed in the U.S. Pat. No. 4,782,328 includes a panel 110, a first photosensor 120, a second photosensor 130 and a processor 140. The panel 110 has a touch screen area 112 which is a rectangle. The first photosensor 120 and the second photosensor 130 are disposed at two opposite ends of a boundary 112*a* of the touch screen area 112. The sensing range of the first photosensor 120 and that of the second photosensor 130 cover the whole touch screen area 112 respectively. Furthermore, the first photosensor 120 and the second photosensor 130 are electrically connected to the processor 140.

When a pointer 150 touches the touch screen area 112, the first photosensor 120 senses the pointer 150 along a first sensing path 162 and the second photosensor 130 senses the pointer 150 along a second sensing path 164. The processor 140 calculates the location of the pointer 150 according to the first sensing path 162 and the second sensing path 164.

However, the conventional touch screen system 100 must have the two photosensors 120 and 130, such that the production cost thereof is relatively high.

BRIEF SUMMARY

The present invention is directed to provide a sensing system of which the production cost is relatively low.

A sensing system adapted to sense a pointer and calculate a location of the pointer, in accordance with an exemplary embodiment of the present invention, is provided. The sensing system includes a panel, a reflective element, an image sensor and a processor. The panel has a first plane and a first area located at the first plane. The first area is quadrangular and has a first boundary, a second boundary, a third boundary and a fourth boundary which are connected in order. The reflective element is disposed at the first boundary and located on the first plane. The reflective element has a second plane substantially perpendicular to the first plane and the second plane is a reflective mirror plane. The second plane mirrors the first area to form a second area. The image sensor is disposed at a corner at which the third boundary and the fourth boundary intersects and located on the first plane. A sensing range of the image sensor covers the first area and the second area. The processor is electrically connected to the image sensor.

When the pointer approaches the first area and the pointer is mirrored by the reflective element to form a first mirror image such that the pointer and the first mirror image is in the sensing range of the image sensor and when a portion of the pointer adjacent to the first area, a portion of the first mirror image adjacent to the second area and the image sensor are not colinear, the image sensor senses the pointer and the first mirror image and the processor calculates the location of the pointer.

In an embodiment of the present invention, the image sensor senses the pointer along a first sensing path and senses the first mirror image along a second sensing path. Furthermore, the processor calculates the location of the pointer according to the first sensing path and the second sensing path.

In an embodiment of the present invention, the first area is a rectangle. The processor has information about a first distance "D1" from the first boundary to the third boundary. The processor calculates the location of the pointer by the following steps. First, a first angle "A1" between the first sensing path and the third boundary is determined. Next, a second angle "A2" between the second sensing path and the third boundary is determined. Next, a second distance "D2" from the pointer to the fourth boundary is calculated by means of dividing the double of D1 by the sum of tan A1 and tan A2.

In an embodiment of the present invention, the sensing system further includes a first linear light source and a second linear light source. The first linear light source is disposed at the second boundary and located on the first plane. The first linear light source is mirrored by the reflective element to form a second mirror image. The second linear light source is disposed at the third boundary and located on the first plane. The second linear light source is mirrored by the reflective element to form a third mirror image. The fourth boundary is mirrored by the reflective element to form a fourth mirror image. The reflective element, the first linear light source, the second linear light source and the fourth boundary surround the first area. The reflective element, the second mirror image, the third mirror image and the fourth mirror image surround the second area. The first linear light source, the second mirror image and the third mirror image are in the sensing range of the image sensor.

In an embodiment of the present invention, the sensing system further includes a first linear reflector and a second reflector. The first light source is disposed beside the image sensor. The first reflector is disposed at the second boundary and located on the first plane. The first reflector is mirrored by the reflective element to form a second mirror image and has a first retro-reflective surface. The first retro-reflective surface is adapted to reflect the light emitted by the first light source. The second reflector is disposed at the third boundary and located on the first plane. The second reflector is mirrored by the reflective element to form a third mirror image and has a second retro-reflective surface. The second retro-reflective surface is adapted to reflect the light emitted by the first light source. The fourth boundary is mirrored by the reflective element to form a fourth mirror image. The reflective element, the first reflector, the second reflector and the fourth boundary surround the first area. The reflective element, the second mirror image, the third mirror image and the fourth mirror image surround the second area. The first reflector, the second mirror image and the third mirror image are in the sensing range of the image sensor. In addition, the first light source is adapted to emit the invisible light. The image sensor has an image-sensing window and a filter. The filter is disposed in front of the image-sensing window and the filter is adapted to filter out the other light except the invisible light such that the invisible light passes through the filter. Furthermore, the first light source is an infrared light emitting diode (IR LED) and the filter is an infrared-pass filter (IR-pass filter).

In an embodiment of the present invention, the first area is quadrangular and not a rectangle. In addition, the processor has information about a first distance "D3" from the first boundary to a first imaginary line passing through the corner and being parallel to the first boundary. The processor calculates the location of the pointer by the following steps. First, a first angle "A3" between the first sensing path and the first imaginary line is determined. Next, a second angle "A4" between the second sensing path and the first imaginary line is determined. Next, a second distance "D4" from the pointer to a second imaginary line passing through the corner and being perpendicular to the first boundary is calculated by means of dividing the double of D3 by the sum of tan A3 and tan A4.

In an embodiment of the present invention, the sensing system further includes a first linear light source, a second linear light source and a third linear light source. The first linear light source is disposed at the second boundary and located on the first plane, and the first linear light source is mirrored by the reflective element to form a second mirror image. The second linear light source is disposed at the third boundary and located on the first plane, and the second linear light source is mirrored by the reflective element to form a third mirror image. The third linear light source is disposed at the fourth boundary and located on the first plane, and the third linear light source is mirrored by the reflective element to form a fourth mirror image. The reflective element, the first linear light source, the second linear light source and the third linear light source surround the first area. The reflective element, the second mirror image, the third mirror image and the fourth mirror image surround the second area. The first linear light source, the second mirror image, the third mirror image and the fourth mirror image are in the sensing range of the image sensor.

In an embodiment of the present invention, the sensing system further includes a first linear reflector, a second reflector and a third reflector. The first light source is disposed beside the image sensor. The first reflector is disposed at the second boundary and located on the first plane. The first reflector is mirrored by the reflective element to form a second mirror image and has a first retro-reflective surface. The first retro-reflective surface is adapted to reflect the light emitted by the first light source. The second reflector is disposed at the third boundary and located on the first plane. The second reflector is mirrored by the reflective element to form a third mirror image and has a second retro-reflective surface. The second retro-reflective surface is adapted to reflect the light emitted by the first light source. The third reflector is disposed at the fourth boundary and located on the first plane. The third reflector is mirrored by the reflective element to form a fourth mirror image and has a third retro-reflective surface. The third retro-reflective surface is adapted to reflect the light emitted by the first light source. The reflective element, the first reflector, the second reflector and the third reflector surround the first area. The reflective element, the second mirror image, the third mirror image and the fourth mirror image surround the second area. The first reflector, the second mirror image, the third mirror image and the fourth mirror image are in the sensing range of the image sensor. In addition, the first light source is adapted to emit the invisible light. The image sensor has an image-sensing window and a filter. The filter is disposed in front of the image-sensing window and the filter is adapted to filter out the other light except the invisible light such that the invisible light passes through the filter. Furthermore, the first light source is an infrared light emitting diode and the filter is an infrared-pass filter.

In an embodiment of the present invention, the sensing system further includes a first light source located above the first plane and outside the first area. The first light source is mirrored by the reflective element to form a second mirror image. The first light source and the second mirror image are located outside the sensing range of the image sensor. The pointer has a reflective surface. The first light source is adapted to emit invisible light, and the first mirror image is formed by means of the first light source illumining the reflective surface of the pointer.

In an embodiment of the present invention, the pointer has a light emitting device, and the first mirror image is formed by means of light emitted from the light emitting device.

In an embodiment of the present invention, when the pointer is adjacent to the first area and the pointer is mirrored by the reflective element to form the first mirror image such that the pointer and the first mirror image are in the sensing range of the image sensor and when the portion of the pointer adjacent to the first area, the portion of the first mirror image adjacent to the second area and the image sensor are colinear, the image sensor senses a size of the pointer along a third sensing path. The processor has information about a relationship between the size of the pointer at the third sensing path and a length of a third distance "D5" from the pointer to the corner. Furthermore, the processor calculates the location of the pointer based on the size of the pointer.

The processor of the sensing system of the embodiment of the present invention can calculate the location of the pointer by means of employing the reflective element and the image sensor. Therefore, compared with the conventional arts, the sensing system of the present embodiment can employ one image sensor such that the production cost thereof is low.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present sensing system, in detail. The following description is given by way of example, and not limitation.

First Embodiment

Figure 1:
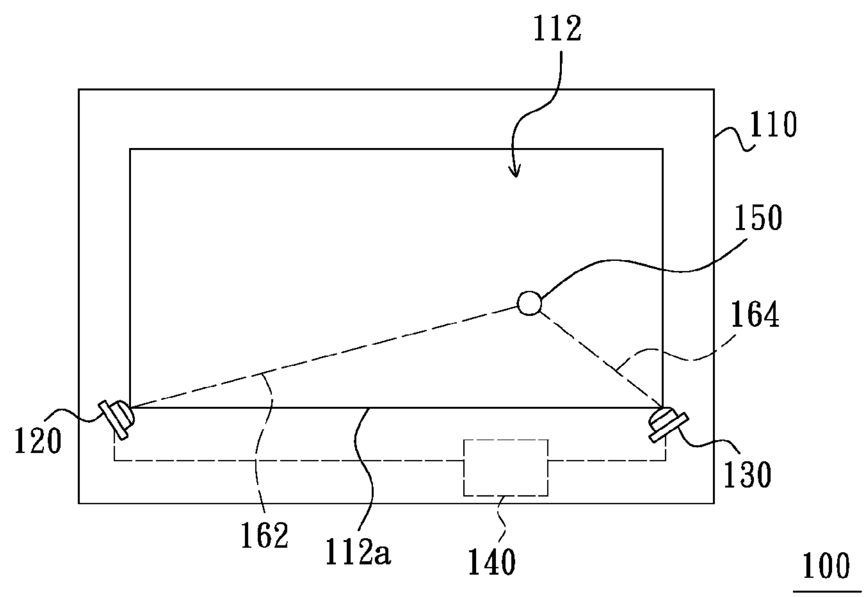
FIG. 1 is a schematic view of a conventional touch screen system.
Figure 2:
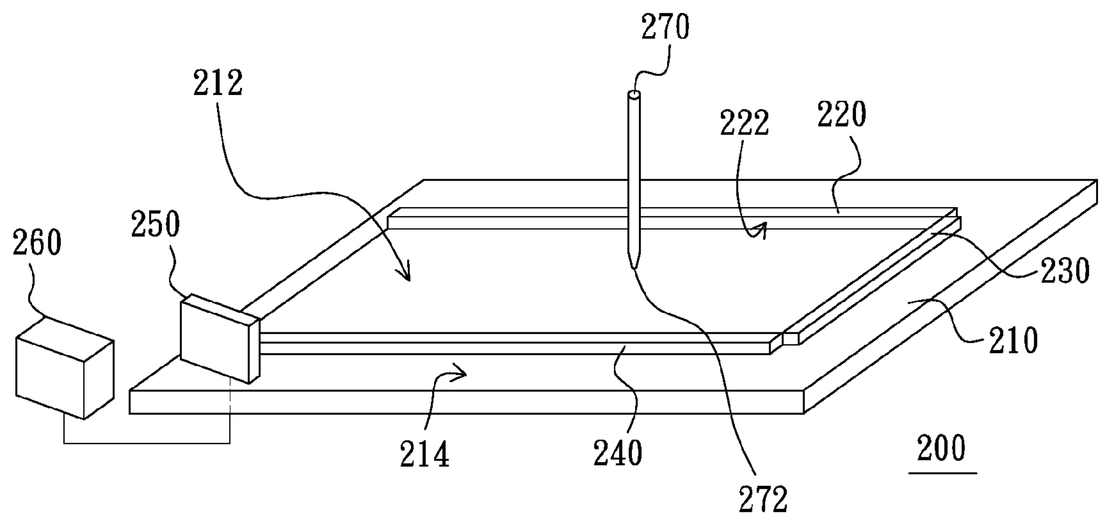
FIG. 2 is a schematic three-dimensional view of a sensing system of a first embodiment of the present invention.
Figure 3:
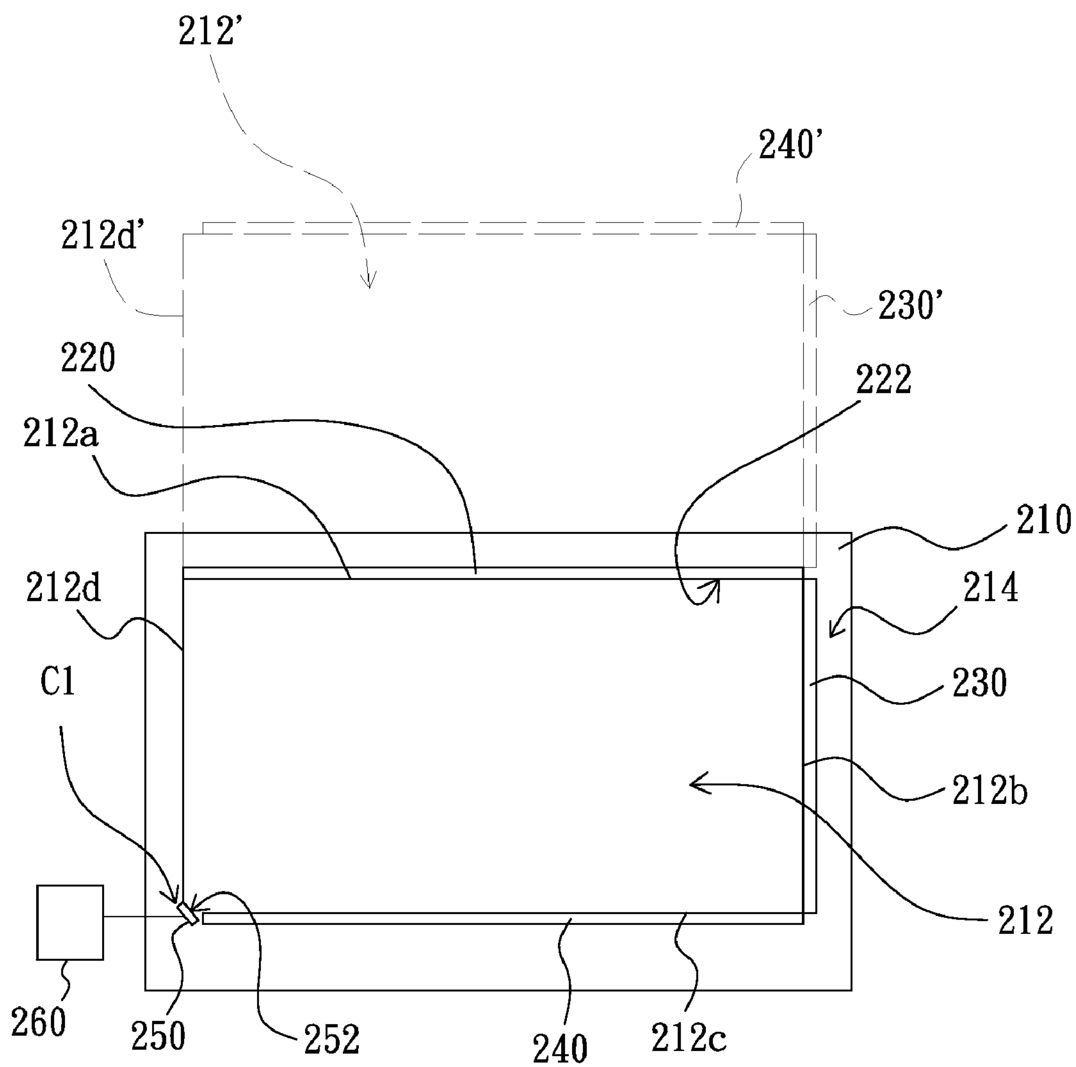
FIG. 3 is a schematic top view of the sensing system of FIG. 2 in operation.

FIG. 2 is a schematic three-dimensional view of a sensing system of a first embodiment of the present invention. FIG. 3 is a schematic top view of the sensing system of FIG. 2 in operation. Referring to FIGS. 2 and 3, the sensing system 200 is adapted to sense a pointer 270 and calculates the location of the pointer 270 (please see the following detailed description). The sensing system 200 includes a panel 210, a reflective element 220, a first linear light source 230, a second linear light source 240, an image sensor 250 and a processor 260. The panel 210, for example, a whiteboard or a touch screen, have a first plane 214 and a first area 212 located at the first plane 214. The first area 212 is quadrangular, such as a rectangle. Furthermore, the first area 212 has a first boundary 212*a*, a second boundary 212*b*, a third boundary 212*c* and a fourth boundary 212*d* which are connected in order.

The reflective element 220 is disposed at the first boundary 212*a* and located on the first plane 214. The reflective element 220 has a second plane 222 substantially perpendicular to the first plane 214. The second plane 222 is a reflective mirror plane. The second plane 222 mirrors the first area 212 to form a second area 212'. The reflective element 220 may be a plane mirror but not limited in this. The first linear light source 230 is disposed at the second boundary 212*b* and located on the first plane 214. The first linear light source 230 is mirrored by the reflective element 220 to form a second mirror image 230'.

The second linear light source 240 is disposed at the third boundary 212*c* and located on the first plane 214. The second linear light source 240 is mirrored by the reflective element 220 to form a third mirror image 240'. The fourth boundary 212*d* is mirrored by the reflective element 220 to form a fourth mirror image 212*d'*. The reflective element 220, the first linear light source 230, the second linear light source 240 and the fourth boundary 212*d* surround the first area 212. The reflective element 220, the second mirror image 230', the third mirror image 240' and the fourth mirror image 212*d'* surround the second area 212'.

The image sensor 250 is disposed at a corner C1 at which the third boundary 212*c* and the fourth boundary 212*d* intersects and located on the first plane 214. A sensing range of the image sensor 250 covers the first area 212 and the second area 212'. The first linear light source 230, the second mirror image 230' and the third mirror image 240' are in the sensing range of the image sensor 250. Furthermore, the processor 260 is electrically connected to the image sensor 250.

Figure 4:
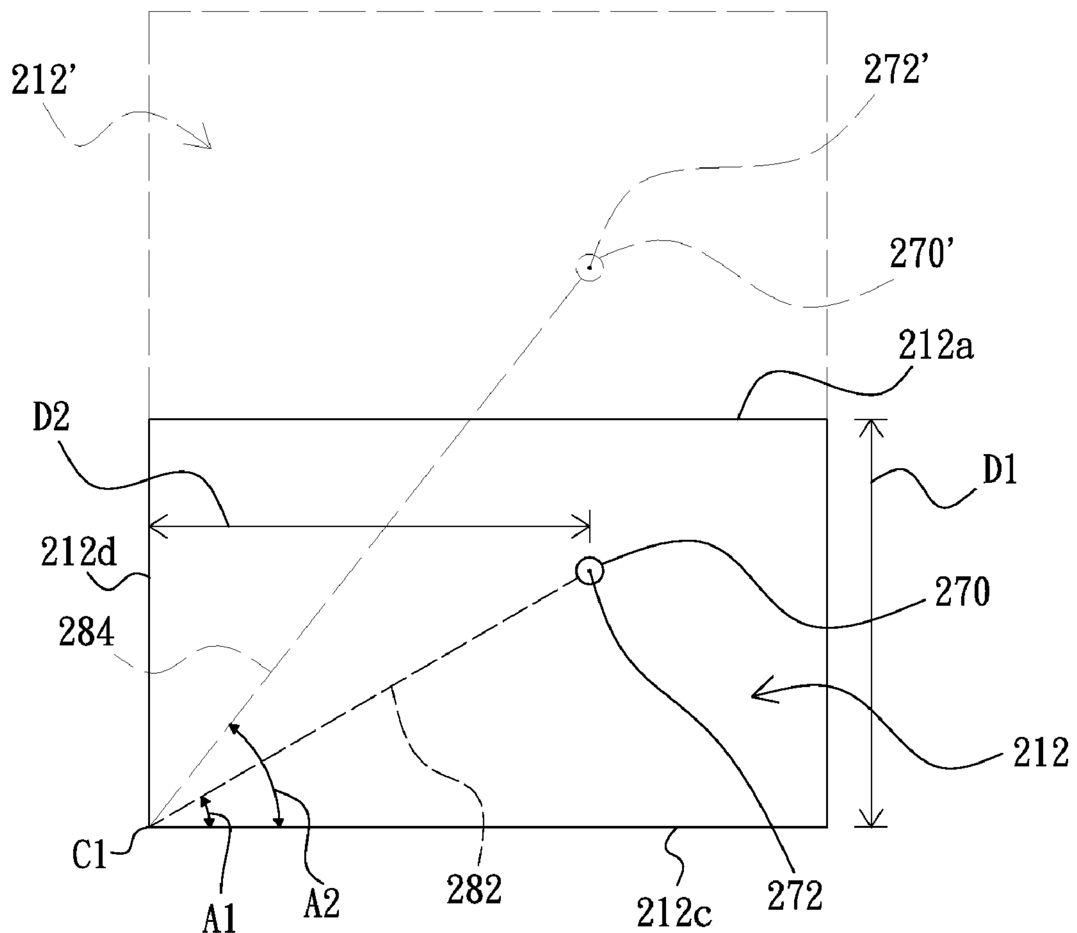
FIG. 4 is a schematic view showing that a processor of FIG. 3 calculates a location of a pointer.
Figure 5:
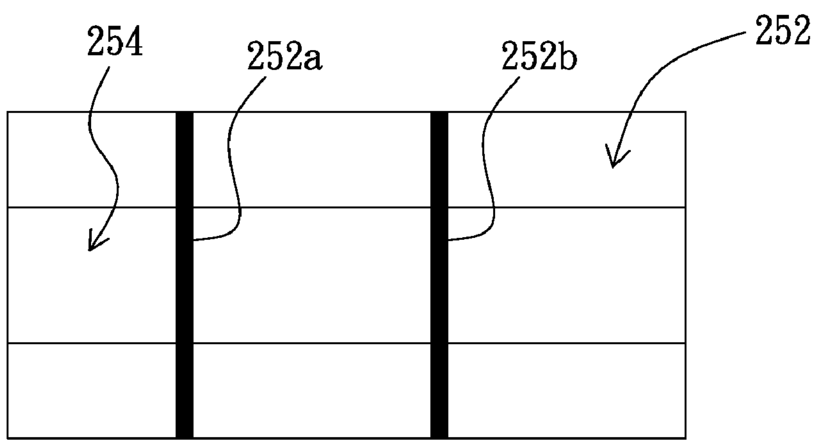
FIG. 5 is a schematic view of an image-sensing window of an image sensor of FIG. 3.

The operation of the sensing system 200 of the present embodiment is described thereinafter. FIG. 4 is a schematic view showing that the processor of FIG. 3 calculates the location of the pointer. FIG. 5 is a schematic view of an image-sensing window of the image sensor of FIG. 3. Referring to FIGS. 3, 4 and 5, when the pointer 270 (as shown in FIG. 2) approaches the first area 212 and the pointer 270 is mirrored by the reflective element 220 to form a first mirror image 270' such that the pointer 270 and the first mirror image 270' are in the sensing range of the image sensor 250 and when a portion of the pointer 270 adjacent to the first area 212, a portion of the first mirror image 270' adjacent to the second area 212' and the image sensor are not colinear, the image sensor 250 senses the pointer 270 and the first mirror image 270' and the processor 260 calculates the location of the pointer 270. Specifically, the image sensor 250 of the present embodiment senses the pointer 270 along a first sensing path 282 and senses the first mirror image 270' along a second sensing path 284, and the processor 260 calculates the location of the pointer 270 according to the first sensing path 282 and the second sensing path 284.

It should be noted that, in the present embodiment, the portion of the pointer 270 adjacent to the first area 212 is a cusp 272 (as shown in FIG. 2) of the pointer 270, and the portion of the first mirror image 270' adjacent to the second area 212' is a cusp 272' of the first mirror image 270'.

Concretely, in the present embodiment, the image sensor 250 has an image-sensing window 252 and a lens (not shown). The lens is disposed in front of the image-sensing window 252 such that the sensing range of the image sensor 250 can cover the first area 212 and the second area 212'. When the pointer 270 is not adjacent to the first area 212, light emitted from the first linear light source 230, the second mirror image 230' and the third mirror image 240' illuminates the image-sensing window 252 to form a bright zone 254 with high brightness on the image-sensing window 252. The bright zone 254 is a primary sensing zone. When the pointer 270 is adjacent to the first area 212, the image sensor 250 senses the pointer 270 along the first sensing path 282, a first obscure strip 252*a* is formed in the bright zone 254 of the image-sensing window 252 and the image sensor 250 outputs a first electrical signal. The processor 260 receives the first electrical signal and determines a first angle A1 between the first sensing path 282 and the third boundary 212*c* according to the location of the first obscure strip 252*a* in the image-sensing window 252. In other words, the information about a relationship between the location of the obscure strip in the image-sensing window 252 and the angle between the sensing path and the third boundary 212*c* may be built in the processor 260 such that the operation for determining the first angle A1 is performed.

Similarly, the image sensor 250 senses the first mirror image 270' along the second sensing path 284. A second obscure strip 252*b* is formed in the bright zone 254 of the image-sensing window 252 and the image sensor 250 outputs a second electrical signal. The processor 260 receives the second electrical signal and determines a second angle A2 between the second sensing path 284 and the third boundary 212*c* according to the location of the second obscure strip 252*b* in the image-sensing window 252. It should be noted that the higher the brightness of the first linear light source 230 and the second linear light source 240 is, the more obvious the first obscure strip 252*a* and the second obscure strip 252*b* in the image-sensing window 252 are.

The information about a first distance D1 from the first boundary 212*a* to the third boundary 212*c* may be built in the processor 260. In the present embodiment, the third boundary 212*c* is defined as the X axis of a Cartesian coordinate system, the fourth boundary 212*d* is defined as the Y axis of the Cartesian coordinate system, and the coordinate of the corner C1 is (0, 0). The X coordinate of the pointer 270 is a second distance D2 from the pointer 270 to the fourth boundary 212*d*. The midpoint between the pointer 270 and the first mirror image 270' is located at the first boundary 212*a*. Accordingly, D1 is equal to $(D2 \cdot \tan A1 + D2 \cdot \tan A2)/2$. Therefore, the processor 260 may calculate the second distance D2 from the pointer 270 to the fourth boundary 212*d* by means of dividing the double of D1 by the sum of tan A1 and tan A2. In other words, the coordinate (D2, D2·tan A1) of the pointer 270 may be calculated by the above method. It should be noted that the above method for calculating the coordinate of the pointer 270 in the Cartesian coordinate system is given as an example and not intended to limit the present invention. A designer can adapt another coordinate system to calculate the coordinate of the pointer according to the requirement of the designer.

The processor 260 of the sensing system 200 of the present embodiment can calculate the location of the pointer 270 by means of employing the reflective element 220 and the image sensor 250. Therefore, compared with the conventional arts, the sensing system 200 of the present embodiment can employ one image sensor 250 such that the production cost of the sensing system 200 is low.

Second Embodiment

Figure 6:
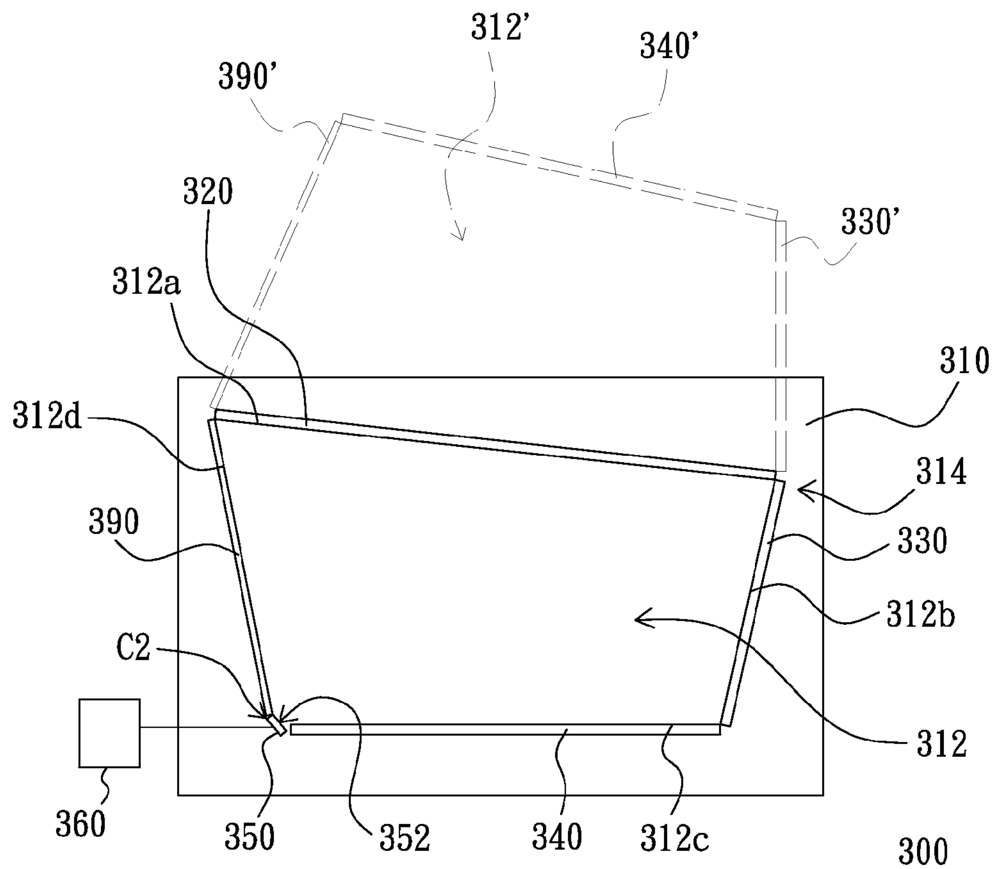
FIG. 6 is a schematic top view of a sensing system in operation of a second embodiment of the present invention.
Figure 7:
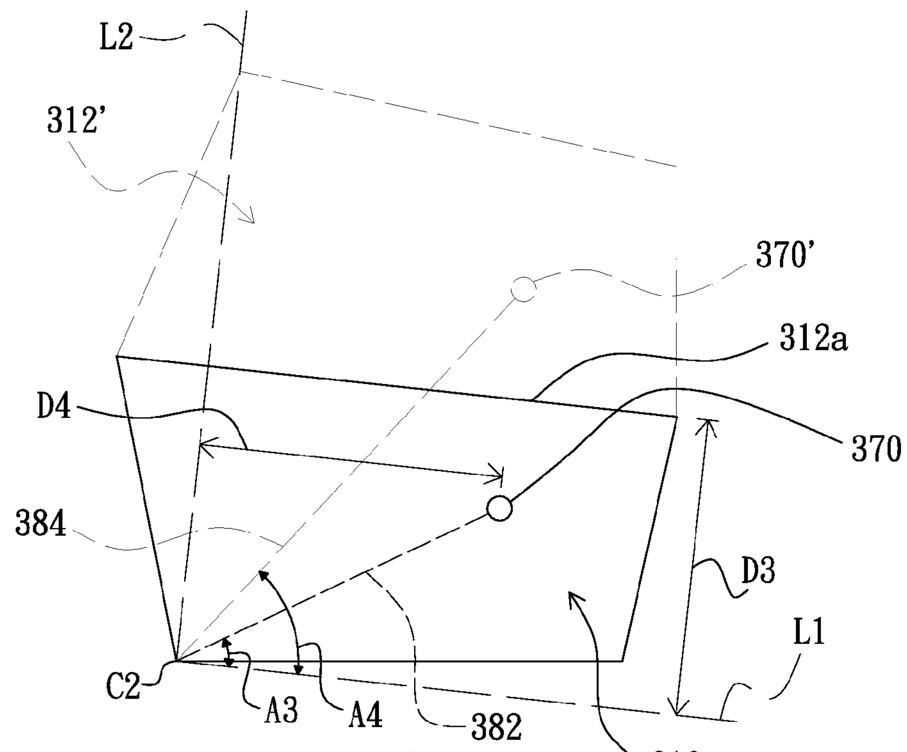
FIG. 7 is a schematic view showing that a processor of FIG. 6 calculates a location of a pointer.

FIG. 6 is a schematic top view of a sensing system in operation of a second embodiment of the present invention. FIG. 7 is a schematic view showing that the processor of FIG. 6 calculates the location of the pointer. Referring to FIGS. 6 and 7, the difference between the sensing system 300 of the present embodiment and the sensing system 200 of the first embodiment lies in that the present sensing system 300 further includes a third linear light source 390 and that the first area 312 located at the first plane 314 of the panel 310 is quadrangular and not a rectangle.

The third linear light source 390 is disposed at the fourth boundary 312*d* of the first area 312, and the third linear light source 390 is mirrored by the reflective element 320 to form a fourth mirror image 390'. The reflective element 320 disposed at the first boundary 312*a* of the first area 312, the first linear light source 330 disposed at the second boundary 312*b* of the first area 312, the second linear light source 340 disposed at the third boundary 312*c* of the first area 312 and the third linear light source 390 surround the first area 312.

The reflective element 320, the second mirror image 330' corresponding to the first linear light source 330 mirrored by the reflective element 320, the third mirror image 340' corresponding to the second linear light source 340 mirrored by the reflective element 320 and the fourth mirror image 390' surround the second area 312'. Furthermore, the image sensor 350 is located at the corner C2 at which the third boundary 312*c* and the fourth boundary 312*d* intersects and the sensing range of the image sensor 350 covers the first area 312 and the second area 312'. The first linear light source 330, the second mirror image 330', the third mirror image 340' and the fourth mirror image 390' are in the sensing range of the image sensor 350. In addition, the pointer 370 is mirrored by the reflective element 320 to form a first mirror image 370'.

The operation of the sensing system 300 of the present embodiment is described thereinafter. In the present embodiment, a first imaginary line L1 passing through the corner C2 and being parallel to the first boundary 312*a* is defined as the X axis of the Cartesian coordinate system. A second imaginary line L2 passing through the corner C2 and being perpendicular to the first boundary 312*a* is defined as the Y axis of the Cartesian coordinate system. The coordinate of the corner C2 is (0,0). The information about a first distance D3 from the first imaginary line L1 to the first boundary 312*a* may be built in the processor 360.

When the pointer 370 approaches the first area 312 and the point 370 is mirrored by the reflective element 320 to form the first mirror image 370' such that the pointer 370 and the first mirror image 370' are in the sensing range of the image sensor 350 and when a portion of the pointer 370 adjacent to the first area 312, a portion of the first mirror image 370' adjacent to the second area 312' and the image sensor 350 are not colinear, the image sensor 350 senses the pointer 370 along the first sensing path 382 and senses the first mirror image 370' along the second sensing path 382. Then, the processor 360 determines a first angle A3 between the first sensing path 382 and the first imaginary line L1 and a second angle A4 between the second sensing path 384 and the first imaginary line L1 according to the first sensing path 382 and the second sensing path 384. Finally, the processor 360 calculates a second distance D4 from the second imaginary line L2 to the pointer 370 by means of dividing the double of D3 by the sum of tan A3 and tan A4. Therefore, the coordinate (D4, D4·tan A3) of the pointer 370 can be calculated by the above method.

It should be noted that, in the present embodiment, the sensing method executed by the image sensor 350 and the method executed by the processor 360 for determining the angles can be referred to the related description in the first embodiment, and not described herein.

Figure 8:
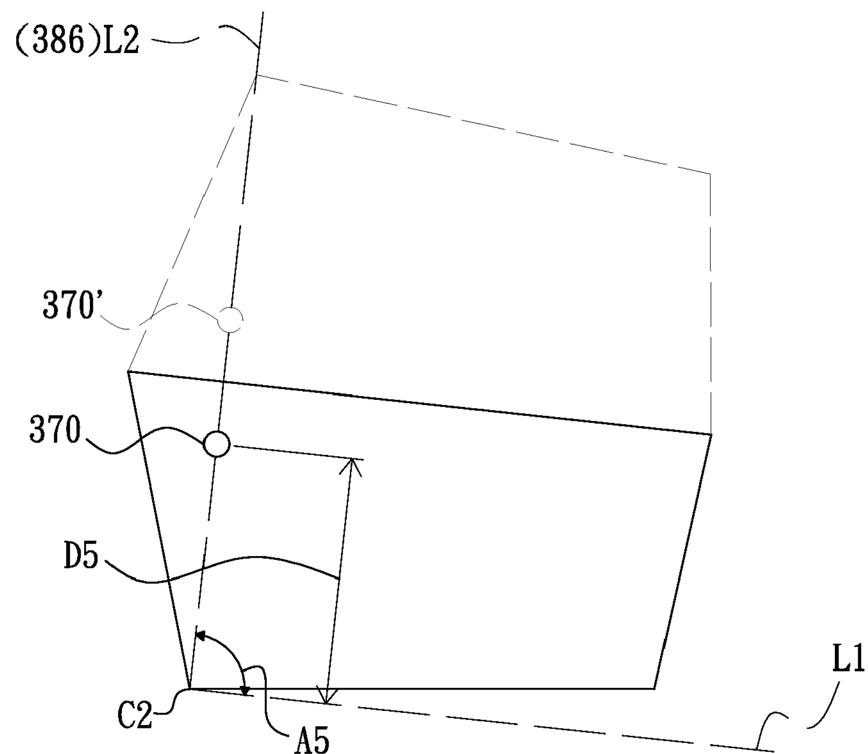
FIG. 8 is another schematic view showing that the processor of FIG. 6 calculates the location of the pointer.
Figure 9:
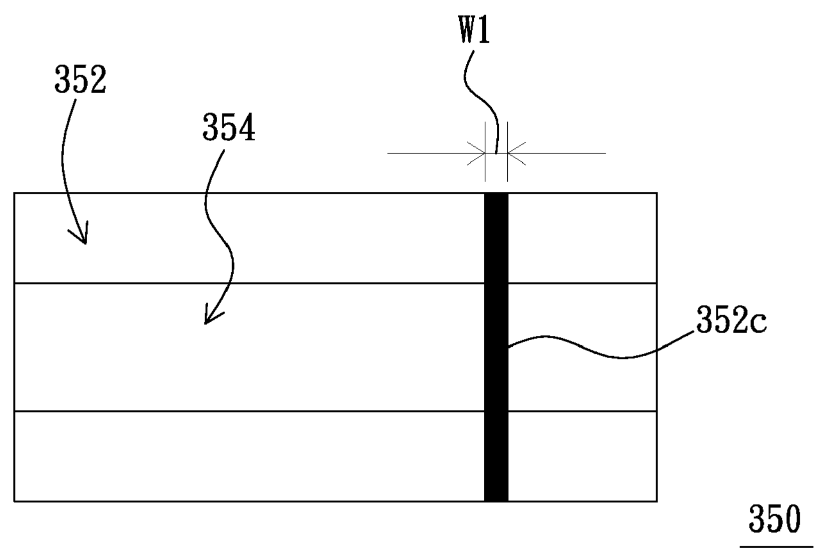
FIG. 9 is a schematic view of an image-sensing window of the image sensor of FIG. 6.

FIG. 8 is another schematic view showing that the processor of FIG. 6 calculates the location of the pointer. FIG. 9 is a schematic view of an image-sensing window of the image sensor of FIG. 6. Referring to FIGS. 6, 8 and 9, in the present embodiment, when the pointer 370 is not adjacent to the first area 312, light emitted from the first linear light source 330, the second mirror image 330', the third mirror image 340' and the fourth mirror image 390' illuminates the image-sensing window 352 (see FIG. 6) to form a bright zone 354 with high brightness on the image-sensing window 352. The bright zone 354 is a primary sensing zone. When the portion of the pointer 370 adjacent to the first area 312, the portion of the first mirror image 370' adjacent to the second area 312' and the imager sensor 350 are colinear, the image sensor 350 senses the size of the pointer 370 along a third sensing path 386 (that is, the second imaginary line L2). It should be noted that the information about a relationship between the size of the pointer 370 at the third sensing path 386 and a length of a third distance D5 from the pointer 370 to the corner C2 may be built in the processor 360 of the present embodiment. The processor 360 calculates the location of the pointer 370 according to the size of the pointer 370.

In other words, the more adjacent to the image-sensing window 352 of the image sensor 350 the pointer 370 is (that is, the smaller the third distance D5 is), the larger the width W1 of the third obscure strip 352*c* in the bright zone 354 of the image-sensing window 352 is. The relationship between the width W1 and the third distance D5 is built in the processor 360 in advance. Therefore, when the pointer 370, the first mirror image 370' and the image sensor 350 are colinear, the processor 360 calculates the third distance D5 based on the size of the pointer 370.

In the present embodiment, the information about the third angle A5 between the third sensing path 386 and the first imaginary line L1 may be built in the processor 360. Therefore, the coordinate (D5·cos A5, D5·sin A5) of the pointer 370 can be calculated. In the present embodiment, the third angle A5 is 90 degrees.

Third Embodiment

Figure 10:
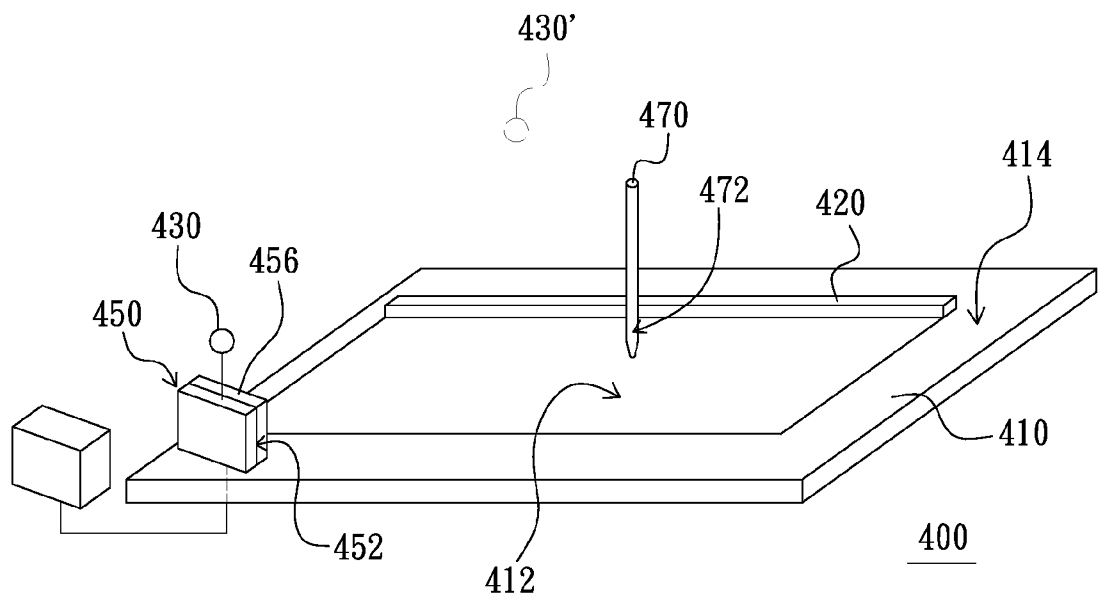
FIG. 10 is a schematic three-dimensional view of a sensing system of a third embodiment of the present invention.

FIG. 10 is a schematic three-dimensional view of a sensing system of a third embodiment of the present invention. Referring to FIGS. 2 and 10, the difference between the sensing system 400 and the sensing system 200 lies in that the first linear light source 230 and the second linear light source 240 are omitted in the sensing system 400. The sensing system 400 includes a first light source 430 located above the first plane 414 of the panel 410 and outside the first area 412. The first light source 430 is mirrored by the reflective element 420 to form a second mirror image 430'. The first light source 430 and the second mirror image 430' are located outside the sensing range of the image sensor 450. The pointer 470 has a reflective surface 472 which may be coated by a reflective material. The reflective material of the reflective surface 472 meets the Europe Standard of EN471 but is not limited in this.

The first light source 430 is adapted to emit invisible light, such as infrared light with the wavelength of about 940 nm. The first mirror image (not shown) corresponding to the pointer 470 mirrored by the reflective element 420 is formed by means of the first light source 430 illumining the reflective surface 472 of the pointer 470. The image sensor 450 may include a filter 456 located in front of the image-sensing window 452. The pointer 470 can reflect the invisible light to the filter 456. The filter 456 is adapted to filter out other light such that the image-sensing window 452 receives the invisible light reflected by the pointer 470. In addition, the image sensor 450 can also sense the first mirror image (not shown) of the pointer 470.

It should be noted that the first area 412 may be quadrangular and not a rectangle, but not shown in any drawing.

Fourth Embodiment

Figure 11:
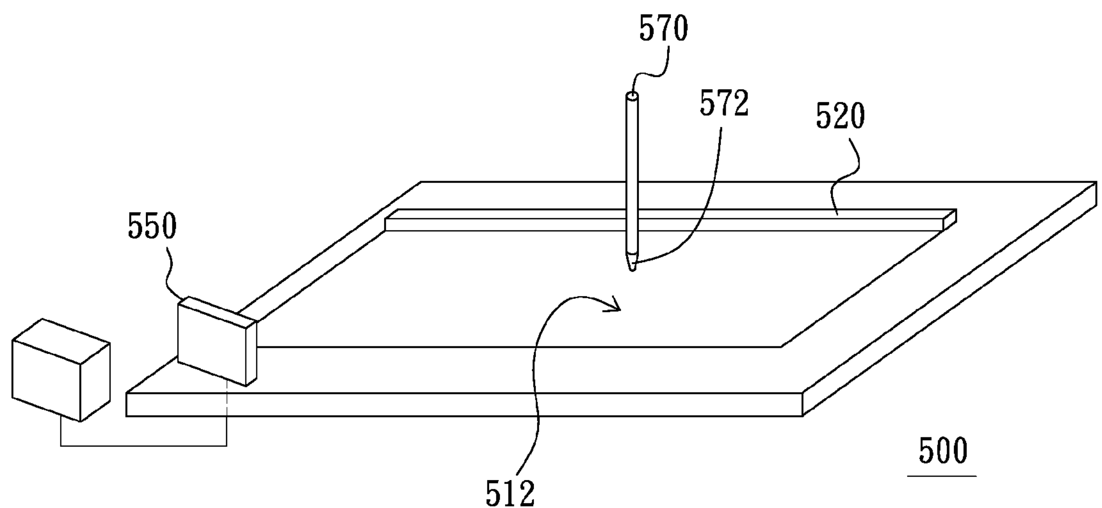
FIG. 11 is a schematic three-dimensional view of a sensing system of a fourth embodiment of the present invention.

FIG. 11 is a schematic three-dimensional view of a sensing system of a fourth embodiment of the present invention. Referring to FIGS. 2 and 11, the difference between the sensing system 500 and the sensing system 200 lies in that the first linear light source 230 and the second linear light source 240 are omitted in the sensing system 500. The pointer 570 has a light emitting device 572 and the first mirror image (not shown) is formed by means of the light emitted from the light emitting device 572. The image sensor 550 can sense the pointer 570 and the first mirror image (not shown) corresponding to the pointer 570 mirrored by the reflective element 520.

It should be noted that the first area 512 may be quadrangular and not a rectangle, but not shown in any drawing.

Fifth Embodiment

Figure 12:
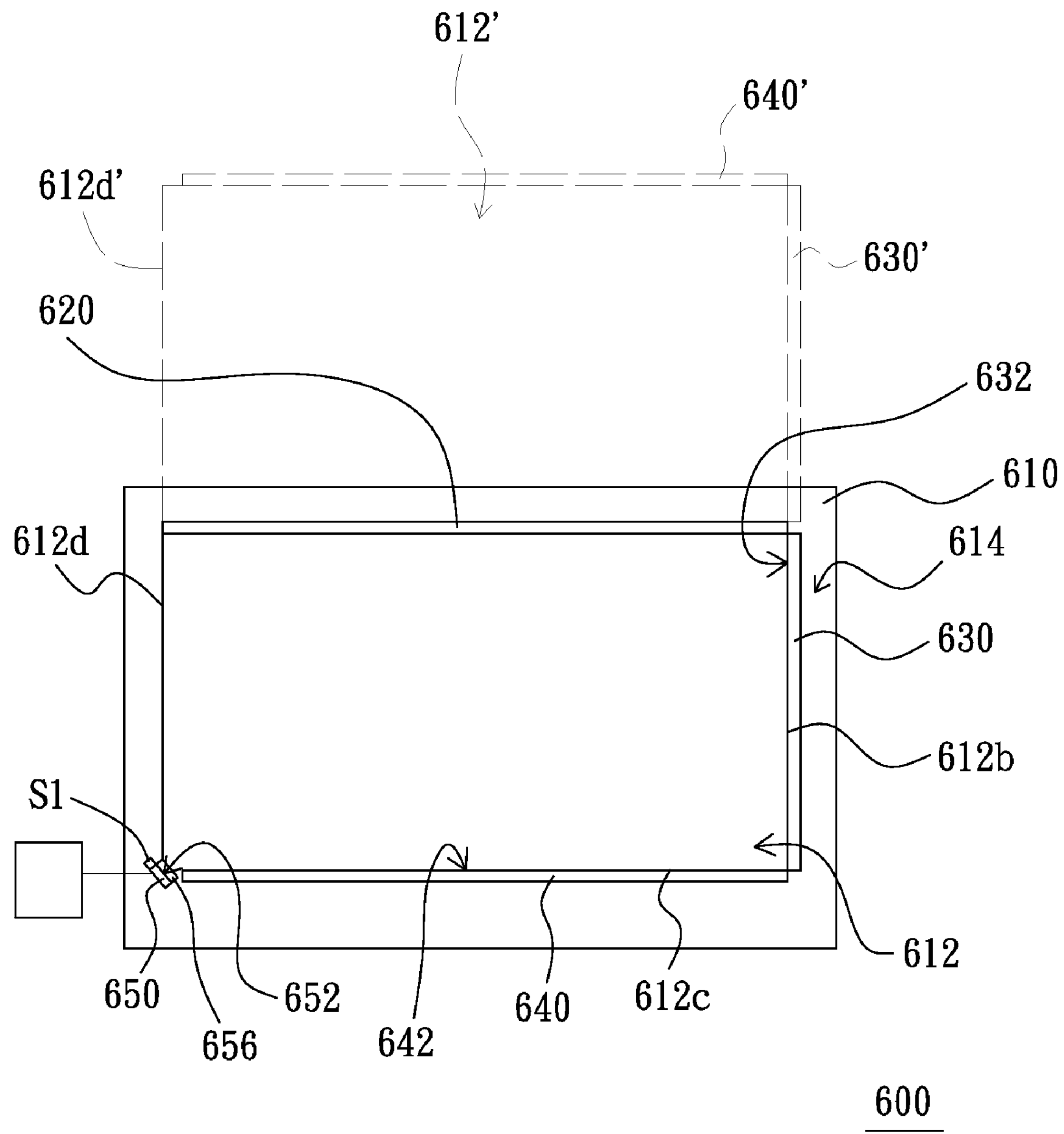
FIG. 12 is a schematic top view of a sensing system in operation of a fifth embodiment of the present invention.

FIG. 12 is a schematic top view of a sensing system in operation of a fifth embodiment of the present invention. Referring to FIGS. 3 and 12, the difference between the sensing system 600 and the sensing system 200 lies in that the first linear light source 230 and the second linear light source 240 are omitted in the sensing system 600. The sensing system 600 further includes a first light source S1, a first reflector 630 and a second reflector 640. The first light source S1 is disposed beside the image sensor 650. The first light source S1 such as an IR LED is adapted to emit the invisible light such as the IR light. The image sensor 650 has a filter 656 such as an IR-pass filter which the IR light can pass through and is disposed in front of the image-sensing window 652.

The first reflector 630 is disposed at the second boundary 612*b* of the first area 612 of the panel 610 and located on the first plane 614 of the panel 610. The first reflector 630 is mirrored by the reflective element 620 to form a second mirror image 630' and has a first retro-reflective surface 632. The first retro-reflective surface 632 is adapted to reflect the light emitted by the first light source S1. In other words, the first reflector 630 is composed of retro-reflective material.

The second reflector 640 is disposed at the third boundary 612*c* of the first area 612 of the panel 610 and located on the first plane 614 of the panel 610. The second reflector 640 is mirrored by the reflective element 620 to form a third mirror image 640' and has a second retro-reflective surface 642. The second retro-reflective surface 642 is adapted to reflect the light emitted by the first light source S1. In other words, the second reflector 640 is also composed of retro-reflective material.

The fourth boundary 612*d* of the first area 612 of the panel 610 is mirrored by the reflective element 620 to form a fourth mirror image 612*d'*. The reflective element 620, the first reflector 630, the second reflector 640 and the fourth boundary 612*d* surround the first area 612. The reflective element 620, the second mirror image 630', the third mirror image 640' and the fourth mirror image 612*d'* surround the second area 612'. The first reflector 630, the second mirror image 630' and the third mirror image 640' are in the sensing range of the image sensor 650.

The first source S1 such as the IR LED emits the IR light. The first retro-reflective surface 632 of the first reflector 630 and the second retro-reflective surface 642 of the second reflector 640 reflect the IR light. In other words, the first retro-reflective surface 632 reflecting the IR light and the second retro-reflective surface 642 reflecting the IR light function as the first linear light source 230 and the second linear light source 240 in the first embodiment. It should not be described in detail herein. Accordingly, the pointer (not shown) and the first mirror image (not shown) thereof form the first obscure strip (not shown) and the second obscure strip (not shown) on the image-sensing window 652 of the image sensor 650, respectively. Please refer to the content of the first embodiment for the related description and it should not be described in detail herein.

Sixth Embodiment

Figure 13:
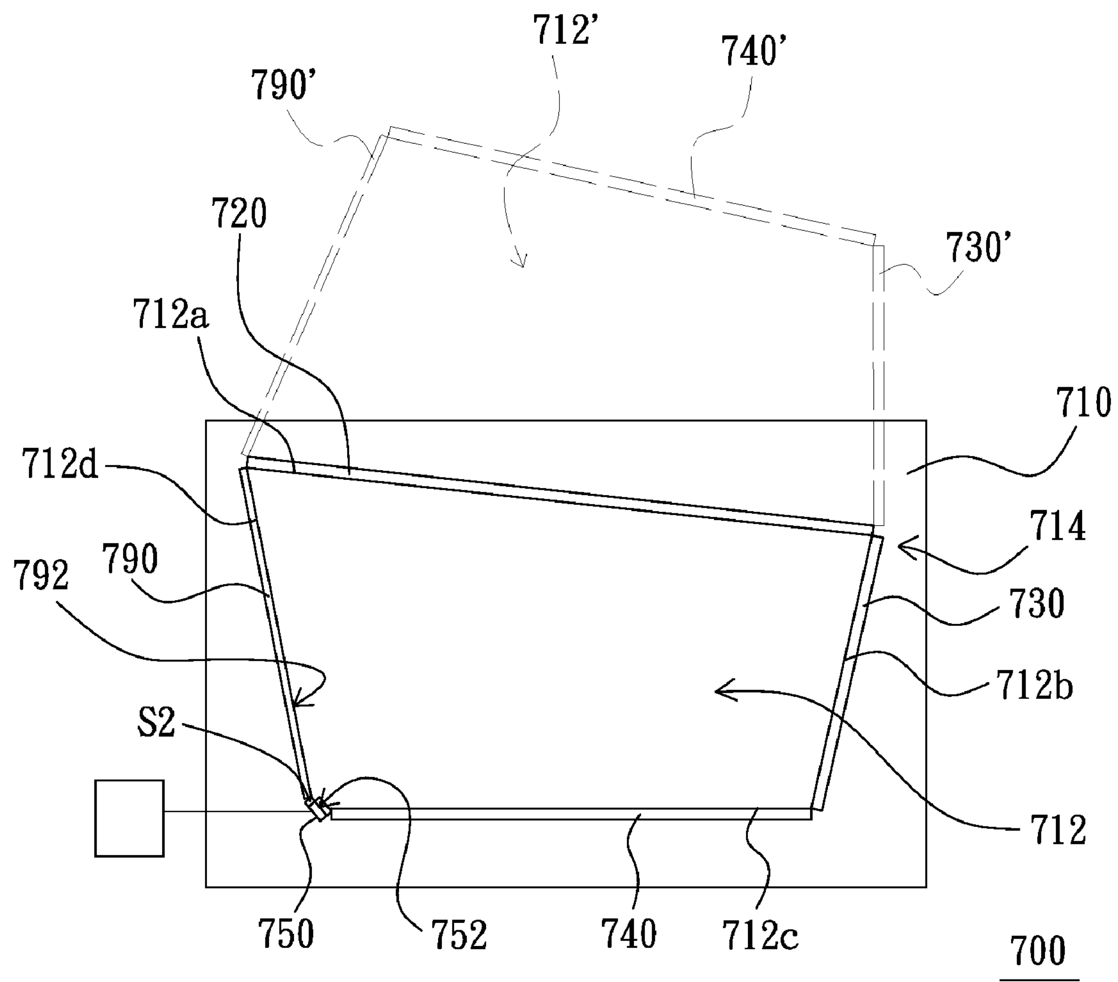
FIG. 13 is a schematic top view of a sensing system in operation of a sixth embodiment of the present invention.

FIG. 13 is a schematic top view of a sensing system in operation of a sixth embodiment of the present invention. Referring to FIGS. 12 and 13, the difference between the sensing system 700 of the present embodiment and the sensing system 600 of the fifth embodiment lies in that the sensing system 700 further includes a third reflector 790 and that the first area 712 located at the first plane 714 of the panel 710 is quadrangular and not a rectangle.

The third reflector 790 is disposed at the fourth boundary 712*d* of the first area 712, and the third reflector 790 is mirrored by the reflective element 720 to form a fourth mirror image 790'. The reflective element 720 disposed at the first boundary 712*a* of the first area 712, the first reflector 730 disposed at the second boundary 712*b* of the first area 712, the second reflector 740 disposed at the third boundary 712*c* of the first area 712 and the third reflector 790 surround the first area 712. the third reflector 790 has a third retro-reflective surface 792 adapted to reflect the light emitted by the first light source S2. In other words, the third reflector 790 is composed of retro-reflective material, too.

The reflective element 720, the second mirror image 730' corresponding to the first reflector 730 mirrored by the reflective element 720, the third mirror image 740' corresponding to the second reflector 740 mirrored by the reflective element 720 and the fourth mirror image 790' surround the second area 712'. The first reflector 730, the second mirror image 730', the third mirror image 740' and the fourth mirror image 790' are in the sensing range of the image sensor 750.

The first source S2 such as the IR LED emits the IR light. The first retro-reflective surface 732 of the first reflector 730, the second retro-reflective surface 742 of the second reflector 740 and the third retro-reflective surface 792 of the third reflector 790 reflect the IR light. In other words, the first retro-reflective surface 732 reflecting the IR light, the second retro-reflective surface 742 reflecting the IR light and the third retro-reflective surface 792 reflecting the IR light function as the first linear light source 330, the second linear light source 340 and the third linear light source in the second embodiment. It should not be described in detail herein. Accordingly, the pointer (not shown) and the first mirror image (not shown) thereof form the first obscure strip (not shown) and the second obscure strip (not shown) on the image-sensing window 752 of the image sensor 750, respectively. Please refer to the content of the first and second embodiments for the related description and it should not be described in detail herein.

In summary, the sensing system of the embodiment of the present invention has the following advantages or other advantages. The processor of the sensing system of the embodiment of the present invention can calculate the location of the pointer by means of employing the reflective element and the image sensor. Therefore, compared with the conventional arts, the present sensing system can employ one image sensor such that the production cost of the sensing system of the embodiment of the present invention is low.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A sensing system adapted to sense a pointer and calculate a location of the pointer, comprising:

a panel having a first plane and a first area located at the first plane, the first area being quadrangular and having a first boundary, a second boundary, a third boundary and a fourth boundary which are connected in order;

a reflective element disposed at the first boundary and located on the first plane, the reflective element having a second plane substantially perpendicular to the first plane, the second plane being a reflective mirror plane and mirroring the first area to form a second area;

an image sensor disposed at a corner at which the third boundary and the fourth boundary intersects and located on the first plane, a sensing range of the image sensor covering the first area and the second area;

a processor electrically connected to the image sensor;

a first light source disposed beside the image sensor;

a first reflector disposed at the second boundary and located on the first plane, the first reflector being mirrored by the reflective element to form a second mirror image, the first reflector having a first retro-reflective surface, the first retro-reflective surface being adapted to reflect the light emitted by the first light source; and a second reflector disposed at the third boundary and located on the first plane, the second reflector being mirrored by the reflective element to form a third mirror image, the second reflector having a second retro-reflective surface, the second retro-reflective surface being adapted to reflect the light emitted by the first light source, the fourth boundary being mirrored by the reflective element to form a fourth mirror image; the reflective element, the first reflector, the second reflector and the fourth boundary surrounding the first area; the reflective element, the second mirror image, the third mirror image and the fourth mirror image surrounding the second area; and the first reflector, the second mirror image and the third mirror image being in the sensing range of the image sensor;

wherein when the pointer approaches the first area and the pointer is mirrored by the reflective element to form a first mirror image such that the pointer and the first mirror image is in the sensing range of the image sensor and when a portion of the pointer adjacent to the first area, a portion of the first mirror image adjacent to the second area and the image sensor are not colinear, the image sensor senses the pointer and the first mirror image and the processor calculates the location of the pointer.

2. The sensing system as claimed in claim 1, wherein the image sensor senses the pointer along a first sensing path and senses the first mirror image along a second sensing path, and the processor calculates the location of the pointer according to the first sensing path and the second sensing path.

3. The sensing system as claimed in claim 2, wherein the first area is a rectangle.

4. The sensing system as claimed in claim 3, wherein the processor has information about a first distance "D1" from the first boundary to the third boundary, and the processor calculates the location of the pointer by the steps of:

determining a first angle "A1" between the first sensing path and the third boundary;

determining a second angle "A2" between the second sensing path and the third boundary; and calculating a second distance "D2" from the pointer to the fourth boundary by means of dividing the double of D1 by the sum of tan A1 and tan A2.

5. The sensing system as claimed in claim 3, further comprising:

a first linear light source disposed at the second boundary and located on the first plane, the first linear light source being mirrored by the reflective element to form a second mirror image; and a second linear light source disposed at the third boundary and located on the first plane, the second linear light source being mirrored by the reflective element to form a third mirror image, the fourth boundary being mirrored by the reflective element to form a fourth mirror image; the reflective element, the first linear light source, the second linear light source and the fourth boundary surrounding the first area; the reflective element, the second mirror image, the third mirror image and the fourth mirror image surrounding the second area; and the first linear light source, the second mirror image and the third mirror image being in the sensing range of the image sensor.

6. The sensing system as claimed in claim 3, wherein the first light source is adapted to emit the invisible light, the image sensor has an image-sensing window and a filter, the filter is disposed in front of the image-sensing window, and the filter is adapted to filter out the other light except the invisible light such that the invisible light passes through the filter.

7. The sensing system as claimed in claim 6, wherein the first light source is an infrared light emitting diode and the filter is an infrared-pass filter.

8. The sensing system as claimed in claim 2, wherein the first area is quadrangular and not a rectangle.

9. The sensing system as claimed in claim 8, wherein the processor has information about a first distance "D3" from the first boundary to a first imaginary line passing through the corner and being parallel to the first boundary, and the processor calculates the location of the pointer by the steps of:

determining a first angle "A3" between the first sensing path and the first imaginary line;

determining a second angle "A4" between the second sensing path and the first imaginary line; and calculating a second distance "D4" from the pointer to a second imaginary line passing through the corner and being perpendicular to the first boundary by means of dividing the double of D3 by the sum of tan A3 and tan A4.

10. The sensing system as claimed in claim 8, further comprising:

a first linear light source disposed at the second boundary and located on the first plane, the first linear light source being mirrored by the reflective element to form a second mirror image;

a second linear light source disposed at the third boundary and located on the first plane, the second linear light source being mirrored by the reflective element to form a third mirror image; and a third linear light source disposed at the fourth boundary and located on the first plane, the third linear light source being mirrored by the reflective element to form a fourth mirror image; the reflective element, the first linear light source, the second linear light source and the third linear light source surrounding the first area; the reflective element, the second mirror image, the third mirror image and the fourth mirror image surrounding the second area; and the first linear light source, the second mirror image, the third mirror image and the fourth mirror image being in the sensing range of the image sensor.

11. The sensing system as claimed in claim 2, further comprising a first light source located above the first plane and outside the first area, the first light source being mirrored by the reflective element to form a second mirror image, the first light source and the second mirror image being located outside the sensing range of the image sensor, the pointer having a reflective surface, the first light source being adapted to emit invisible light, the first mirror image being formed by means of the first light source illumining the reflective surface of the pointer.

12. The sensing system as claimed in claim 2, wherein the pointer has a light emitting device, and the first mirror image is formed by means of light emitted from the light emitting device.

13. The sensing system as claimed in claim 1, wherein when the pointer approaches the first area and the pointer is mirrored by the reflective element to form the first mirror image such that the pointer and the first mirror image are in the sensing range of the image sensor and when a portion of the pointer adjacent to the first area, a portion of the first mirror image adjacent to the second area and the image sensor are colinear, the image sensor senses a size of pointer along a third sensing path, the processor has information about a relationship between the size of the pointer at the third sensing path and a length of a third distance "D5" from the pointer to the corner and the processor calculates the location of the pointer based on the size of the pointer.

14. A sensing system adapted to sense a pointer and calculate a location of the pointer, comprising:

a panel having a first plane and a first area located at the first plane, the first area being quadrangular and having a first boundary, a second boundary, a third boundary and a fourth boundary which are connected in order;

a reflective element disposed at the first boundary and located on the first plane, the reflective element having a second plane substantially perpendicular to the first plane, the second plane being a reflective mirror plane and mirroring the first area to form a second area;

an image sensor disposed at a corner at which the third boundary and the fourth boundary intersects and located on the first plane, a sensing range of the image sensor covering the first area and the second area;

a processor electrically connected to the image sensor;

a first light source disposed beside the image sensor;

a first reflector disposed at the second boundary and located on the first plane, the first reflector being mirrored by the reflective element to form a second mirror image, the first reflector having a first retro-reflective surface, the first retro-reflective surface being adapted to reflect the light emitted by the first light source;

a second reflector disposed at the third boundary and located on the first plane, the second reflector being mirrored by the reflective element to form a third mirror image, the second reflector having a second retro-reflective surface, the second retro-reflective surface being adapted to reflect the light emitted by the first light source; and a third reflector disposed at the fourth boundary and located on the first plane, the third reflector being mirrored by the reflective element to form a fourth mirror image, the third reflector having a third retro-reflective surface, the third retro-reflective surface being adapted to reflect the light emitted by the first light source; the reflective element, the first reflector, the second reflector and the third reflector surrounding the first area; the reflective element, the second mirror image, the third mirror image and the fourth mirror image surrounding the second area; and the first reflector, the second mirror image, the third mirror image and the fourth mirror image being in the sensing range of the image sensor;

wherein when the pointer approaches the first area and the pointer is mirrored by the reflective element to form a first mirror image such that the pointer and the first mirror image is in the sensing range of the image sensor and when a portion of the pointer adjacent to the first area, a portion of the first mirror image adjacent to the second area and the image sensor are not colinear, the image sensor senses the pointer and the first mirror image and the processor calculates the location of the pointer.

15. The sensing system as claimed in claim 14, wherein the first area is quadrangular and not a rectangle.

16. The sensing system as claimed in claim 15, wherein the first light source is adapted to emit the invisible light, the image sensor has an image-sensing window and a filter, the filter is disposed in front of the image-sensing window, and the filter is adapted to filter out the other light except the invisible light such that the invisible light passes through the filter.

17. The sensing system as claimed in claim 16, wherein the first light source is an infrared light emitting diode and the filter is an infrared-pass filter.

* * * * *